(12) United States Patent
Reckmann et al.

(10) Patent No.: US 7,940,192 B2
(45) Date of Patent: May 10, 2011

(54) CHANNEL EQUALIZATION FOR MUD-PULSE TELEMETRY

(75) Inventors: Hanno Reckmann, Nienhagen (DE); Ingolf Wassermann, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 891 days.

(21) Appl. No.: 11/675,025

(22) Filed: Feb. 14, 2007

(65) Prior Publication Data

US 2007/0132606 A1 Jun. 14, 2007

Related U.S. Application Data

(60) Provisional application No. 60/773,011, filed on Feb. 14, 2006.

(51) Int. Cl.
*G01V 3/00* (2006.01)
(52) U.S. Cl. ............... 340/855.4; 340/853.1; 340/870.2; 367/35; 367/57; 367/83
(58) Field of Classification Search .............. 340/853.1, 340/855, 870.2, 855.4; 367/57, 35, 83
See application file for complete search history.

(56) References Cited

U.S. PATENT DOCUMENTS

| | | | |
|---|---|---|---|
| 3,716,830 A | 2/1973 | Garcia ................... 340/18 LD |
| 3,742,443 A | 6/1973 | Foster et al. ............. 340/18 LD |
| 3,747,059 A | 7/1973 | Garcia ................... 340/18 LD |
| 4,262,343 A | 4/1981 | Claycomb ................. 367/83 |
| 4,590,593 A | 5/1986 | Rodney .................... 367/83 |
| 4,642,800 A | 2/1987 | Umeda ..................... 367/85 |
| 4,692,911 A | 9/1987 | Scherbatskoy .............. 367/83 |
| 4,715,022 A | 12/1987 | Yeo ........................ 367/83 |
| 4,733,232 A * | 3/1988 | Grosso .................... 367/82 |
| 5,113,379 A | 5/1992 | Scherbatskoy .............. 367/83 |
| 5,146,433 A | 9/1992 | Kosmala et al. ............ 367/83 |
| 5,222,048 A * | 6/1993 | Grosso et al. ............. 367/32 |
| 5,490,121 A * | 2/1996 | Gardner et al. ............ 367/83 |
| 5,969,638 A | 10/1999 | Chin ..................... 340/855.3 |
| 6,208,586 B1 * | 3/2001 | Rorden et al. .............. 367/35 |
| 6,370,082 B1 | 4/2002 | Gardner et al. ............ 367/82 |
| 6,434,084 B1 * | 8/2002 | Schultz .................... 367/81 |
| 6,626,253 B2 | 9/2003 | Hahn et al. ................ 175/48 |
| 6,657,597 B2 * | 12/2003 | Rodney et al. ............. 343/719 |
| 6,741,185 B2 | 5/2004 | Shi et al. ............... 340/853.2 |
| 6,753,791 B2 * | 6/2004 | Wei et al. ............... 340/854.9 |
| RE38,567 E | 8/2004 | Gruenhagen ............... 340/679 |
| 2003/0056985 A1 * | 3/2003 | Hahn et al. ................ 175/48 |
| 2003/0063664 A1 * | 4/2003 | Bodenschatz ............... 375/232 |
| 2005/0053127 A1 * | 3/2005 | Shiue et al. ............... 375/232 |
| 2005/0168349 A1 * | 8/2005 | Huang et al. ............. 340/854.3 |
| 2005/0285751 A1 * | 12/2005 | Hall et al. ............... 340/853.1 |
| 2006/0118334 A1 * | 6/2006 | Hahn et al. ................ 175/48 |
| 2007/0126596 A1 * | 6/2007 | Hall et al. ............... 340/854.9 |

FOREIGN PATENT DOCUMENTS

GB 2361789 A * 10/2001
GB 2399921 A * 9/2004

* cited by examiner

*Primary Examiner* — Timothy Edwards, Jr.
*Assistant Examiner* — Amine Benlagsir
(74) *Attorney, Agent, or Firm* — Mossman Kumar & Tyler PC

(57) ABSTRACT

Channel estimation and signal equalization is used in a mud-pulse telemetry system for uplink communication during drilling of wellbores.

17 Claims, 9 Drawing Sheets

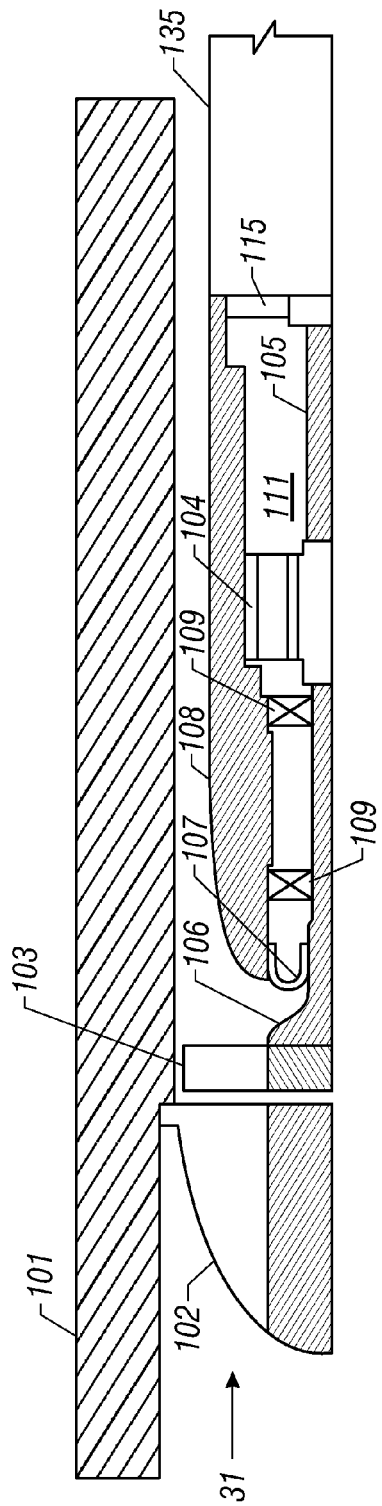
FIG. 2A
(Prior Art)
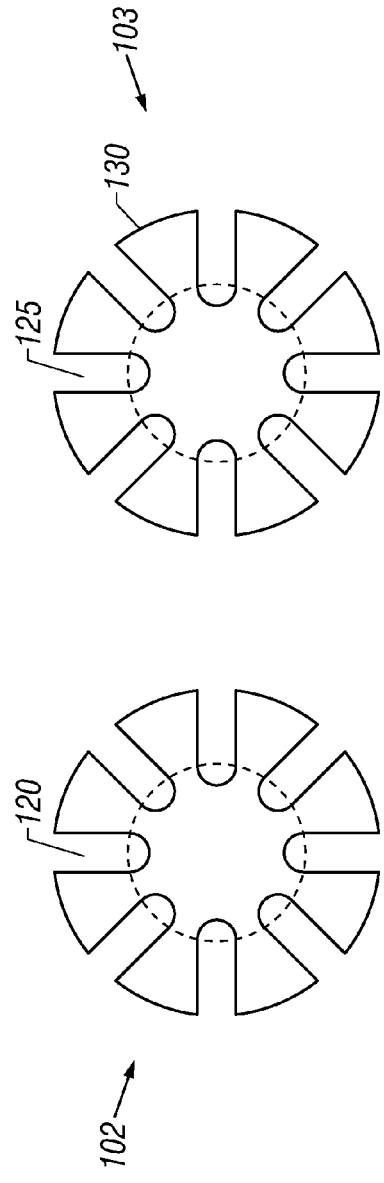
FIG. 2B
(Prior Art)
FIG. 2C
(Prior Art)

CHANNEL EQUALIZATION FOR MUD-PULSE TELEMETRY

CROSS-REFERENCES TO RELATED APPLICATIONS

This application claims priority from U.S. provisional patent application Ser. No. 60/773,011 filed on Feb. 14, 2006. The application also claims priority as a continuation in part of U.S. patent application Ser. No. 11/311,196 filed on Dec. 19, 2005 which is a continuation in part of U.S. patent application Ser. No. 11/018,344 filed on Dec. 21, 2004.

BACKGROUND OF THE INVENTION

1. Field of the Invention

The present invention relates to telemetry systems for communicating information from a downhole location to a surface location, and, more particularly, to a method of removing noise at the surface location produced by surface sources.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameters include logging data such as resistivity of the various layers, sonic density, porosity, induction, self potential and pressure gradients. This information is important to efficiency in the drilling operation.

MWD Telemetry is required to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the BHA that can generate pressure fluctuations in the mud stream. The surface receiver system consists of sensors that measure the pressure fluctuations and/or flow fluctuations, and signal processing modules that interpret these measurements.

Down-linking is achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn '253 is an anti-plugging oscillating shear valve system for generating pressure fluctuations in a flowing drilling fluid. The system includes a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

U.S. Pat. No. RE38,567 to Gruenhagen et al., having the same assignee as the present invention and the contents of which are fully incorporated herein by reference, and U.S. Pat. No. 5,113,379 to Scherbatskoy teach methods of down-link telemetry in which flow rate is controlled using a bypass-actuator and controller.

Drilling systems (described below) include mud pumps for conveying drilling fluid into the drillstring and the borehole. Pressure waves from surface mud pumps produce considerable amounts of noise. The pump noise is the result of the motion of the mud pump pistons. The pressure waves from the mud pumps travel in the opposite direction from the uplink telemetry signal. Components of the noise waves from the surface mud pumps may be present in the frequency range used for transmission of the uplink telemetry signal and may even have a higher level than the received uplink signal, making correct detection of the received uplink signal very difficult. Additional sources of noise include the drilling motor and drill bit interaction with the formation. All these factors degrade the quality of the received uplink signal and make it difficult to recover the transmitted information.

There have been numerous attempts to find solutions for reducing interfering effects in MWD telemetry signals. U.S. Pat. Nos. 3,747,059 and 3,716,830 to Garcia teach methods of reducing the effect of mud pump noise wave reflecting off the flexible hose; other reflections or distortions of the noise or signal waves are not addressed.

U.S. Pat. No. 3,742,443 to Foster et al. teaches a noise reduction system that uses two spaced apart pressure sensors. The optimum spacing of the sensors is one-quarter wavelength at the frequency of the telemetry signal carrier. The signal from the sensor closer to the mud pumps is passed through a filter having characteristics related to the amplitude and phase distortion encountered by the mud pump noise component as it travels between the two spaced points. The filtered signal is delayed and then subtracted from the signal derived from the sensor further away from the mud pumps. The combining function leads to destructive interference of the mud pump noise and constructive interference of the telemetry signal wave, because of the one-quarter wavelength separation between the sensors. The combined output is then passed through another filter to reduce distortion introduced by the signal processing and combining operation. The system does not account for distortion introduced in the telemetry signal wave as it travels through the mud column from the downhole transmitter to the surface sensors. The filter on the combined output also assumes that the mud pump noise wave traveling from the mud pumps between the two sensors encounters the same distortion mechanisms as the telemetry signal wave traveling in the opposite direction between the same pair of sensors. This assumption does not, however, always hold true in actual MWD systems.

U.S. Pat. No. 4,262,343 to Claycomb discloses a system in which signals from a pressure sensor and a fluid velocity detector are combined to cancel mud pump noise and enhance the signal from downhole. U.S. Pat. No. 4,590,593 to Rodney discloses a two sensor noise canceling system similar to those of Garcia and Foster et al., but with a variable delay. The delay is determined using a least mean squares algorithm during the absence of downhole data transmission. U.S. Pat. No. 4,642,800 issued to Umeda discloses a noise-reduction scheme that includes obtaining an "average pump signature" by averaging over a certain number of pump cycles. The assumption is that the telemetry signal is not periodic with the same period as the pump noise and, hence, will average to zero. The pump signature is then subtracted from the incoming signal to leave a residual that should contain mostly telemetry signal. U.S. Pat.

No. 5,146,433 to Kosmala et al. uses signals from position sensors on the mud pumps as inputs to a system that relates the mud pump pressure to the position of the pump pistons. Thus, the mud pump noise signature is predicted from the positions of the pump pistons. The predicted pump noise signature is subtracted from the received signal to cancel the pump noise component of the received signal.

U.S. Pat. No. 4,715,022 to Yeo discloses a signal detection method for mud pulse telemetry systems using a pressure transducer on the gas filled side of the pulsation dampener to improve detection of the telemetry wave in the presence of mud pump noise. One of the claims includes a second pressure transducer on the surface pipes between the dampener and the drill string and a signal conditioner to combine the signals from the two transducers. Yeo does not describe how the two signals may be combined to improve signal detection.

U.S. Pat. No. 4,692,911 to Scherbatskoy discloses a scheme for reducing mud pump noise by subtracting from the received signal, the signal that was received T seconds previously, where T is the period of the pump strokes. The received signal comes from a single transducer. A delay line is used to store the previous noise pulse from the mud pumps and this is then subtracted from the current mud pump noise pulse. This forms a comb filter with notches at integer multiples of the pump stroke rate. The period T of the mud pumps may be determined from the harmonics of the mud pump noise, or from sensors placed on or near the mud pumps. The telemetry signal then needs to be recovered from the output of the subtraction operation (which includes the telemetry signal plus delayed copies of the telemetry signal).

U.S. Pat. No. 5,969,638 to Chin discloses a signal processor for use with MWD systems. The signal processor combines signals from a plurality of signal receivers on the standpipe, spaced less than one-quarter wavelength apart to reduce mud pump noise and reflections traveling in a downhole direction. The signal processor isolates the derivative of the forward traveling wave, i.e., the wave traveling up the drill string, by taking time and spatial derivatives of the wave equation. Demodulation is then based on the derivative of the forward traveling wave. The signal processor requires that the signal receivers be spaced a distance of five to fifteen percent of a typical wavelength apart.

All the aforementioned prior art systems are attempting to find a successful solution that would eliminate a substantial portion or all of the mud pump noise measured by transducers at the surface and, in so doing, improve reception of telemetry signals transmitted from downhole. Some of these systems also attempt to account for reflected waves traveling back in the direction of the source of the original waves. However, none provide means for substantially reducing mud pump noise while also dealing with distortion caused by the mud channel and reflected waves.

GB 2361789 to Tennent et al. teaches a receiver and a method of using the receiver for use with a mud-pulse telemetry system. The receiver comprises at least one instrument for detecting and generating signals in response to a telemetry wave and a noise wave traveling opposite the telemetry wave, the generated signals each having a telemetry wave component and a noise wave component. A filter receives and combines the signals generated by the instruments to produce an output signal in which the noise wave component is filtered out. An equalizer reduces distortion of the telemetry wave component of the signals. The teachings of Tennent include correcting for a plurality of reflectors that, in combination with the uplink and mud pump signals, affect that received signals. In essence, Tennent determines a transfer function for the mud channel in both directions. Determination of these transfer functions is difficult when both the mud pump and the downhole pulser are operating. The present invention addresses this difficulty with a simple solution. In practical digital communication systems that are designed to transmit at high speed through band-limited channels, the frequency response of the channel is not known. The channel distortion results in intersymbol interference, which, if left uncompensated, causes high error rates. The compensator for the intersymbol interference is called an equalizer

SUMMARY OF THE INVENTION

One embodiment of the present invention is a method of communicating a signal through a fluid in a borehole between a downhole location and a surface location. A first signal is measured at or near the surface in response to generation of a message signal at the downhole location. The message signal is estimated by applying a channel equalization filter derived from a measured signal at a surface location responsive to a reference signal the downhole location. The reference signal may be a chirp signal. A noise cancellation filter may be applied to the first signal prior to application of the equalization filter. The equalization filter may be determined from a ratio of a Fourier transform of the measured signal and a Fourier transform of the reference signal. The equalization filter may be determined by minimizing an error function. The message signal may represent an output of the formation evaluation sensor and the method may further include storing the estimated message signal on a tangible medium. The noise cancellation filter may be a pump noise cancellation filter or it may be a filter derived from dual sensor measurements. The equalization filter may be applied at more than one time.

Another embodiment of the invention is a system for communicating a signal through a fluid in a borehole between a bottomhole assembly (BHA) and a surface location. The system includes a message source on the bottomhole assembly (BHA) configured to generate a message signal. The source sends a message signal through the mud channel that is received at the surface. A sensor at a surface location is configured to provide a first signal responsive to the message signal. The system includes a processor configured to estimate the message signal by applying a channel equalization filter to the first signal, and deriving the channel equalization filter using a measured signal at the surface location responsive to a reference signal generated by the message source. The reference signal may be a chirp signal. The processor may further be configured to apply a noise cancellation filter to the first signal prior to applying the equalization filter. The processor may further be configured to determine the equalization filter from a ratio of a Fourier transform of the measured signal and a Fourier transform of the reference signal. The processor may be configured to determine the equalization filter by minimizing an error function. The noise cancellation filter may be a pump noise cancellation filter and/or a filter derived from dual sensor measurements. The message source may comprise an oscillating shear valve.

Another embodiment of the invention is a machine readable medium for use in conjunction with system including a bottomhole assembly (BHA) conveyed in a borehole in an earth formation. The system includes a formation evaluation sensor on the BHA configured to make a measurement indicative of a property of the earth formation. A message source on the BHA is configured to generate a message signal indicative of the property, the message signal propagating to a surface location to a fluid in the borehole. The system further includes a sensor at a surface location configured to provide a first signal responsive to the message signal. The medium further includes instructions which enable the processor to estimate the message signal using an equalization filter derived using a measured signal at a surface location responsive to a reference signal generated by the message source. The machine readable medium may be a ROM, an EPROM, an EAROM, a Flash Memory, and/or an Optical disk.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIGS. 2a-2c (prior art) is a schematic of an oscillating shear valve suitable for use with the present invention;

DETAILED DESCRIPTION OF THE INVENTION

Figure 1:
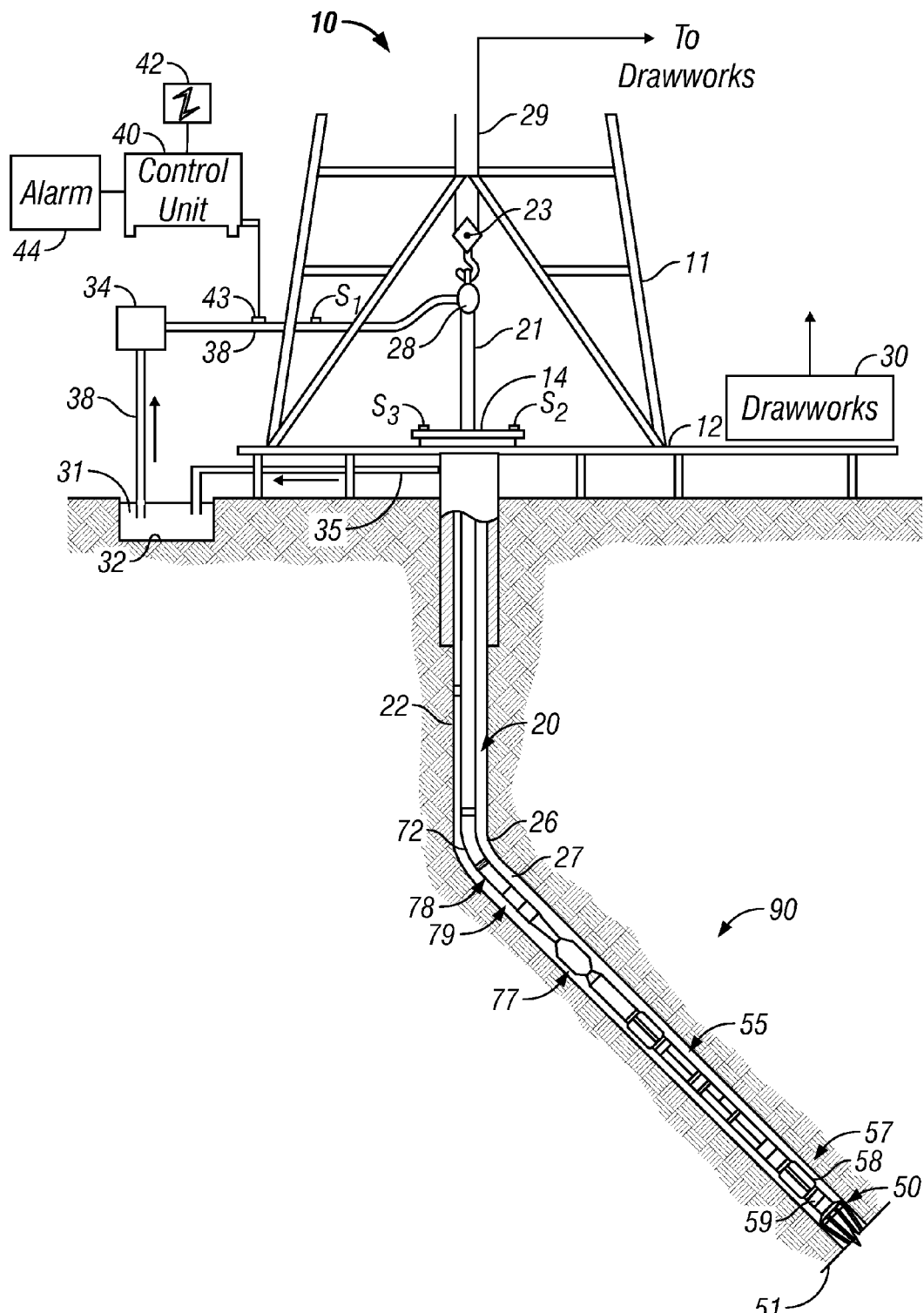
FIG. 1 (prior art) is a schematic illustration of a drilling system suitable for use with the present invention.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

FIG. 2a is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2a and 2b, is fixed with respect to the tool housing 101 and to the pulser housing 108 and has multiple lengthwise flow passages 120. The rotor 103, see FIGS. 2a and 2c, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), Phase Shift Keying (PSK), continuous phase modulation (CPM), or a combination of these techniques.

In one embodiment of the invention, the tool housing 101 has pressure sensors, not shown, mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3:
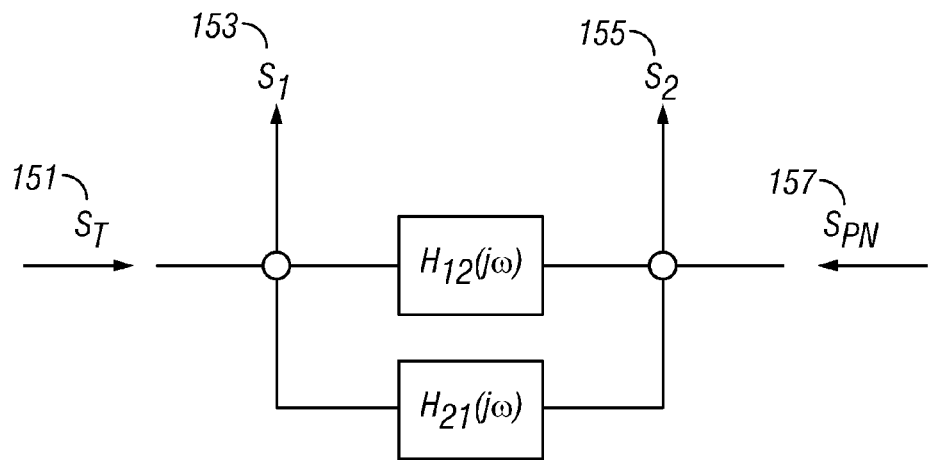
FIG. 3 is an illustration of the channel transfer function.

Turning now to FIG. 3, a block diagram showing the propagation of signals is shows. Denoted by 151 and 157 are the telemetry (message) signal $s_T$ and the pump noise $s_{PN}$. The signals are detected by two sensors $s_1$ and $s_2$ (153, 155 respectively). The mixture of the telemetry signal $s_T$ and pump noise $s_{PN}$, both signal waves traveling in opposite direction through the system with the transfer functions $H_{12}(j\omega)$ and $H_{21}(j\omega)$ for each direction, will be measured by two sensors as $$s_1(t) = s_T + F^{-1}(H_{21}(j\omega)) * s_{PN},$$

$$s_2(t) = s_{PN} + F^{-1}(H_{12}(j\omega)) * s_T \quad (1)$$

where $F^{-1}$ is the inverse Fourier transform and * is the convolution operator. In a first step the transfer function between these two sensors is evaluated in the absence of any telemetry signals $s_T(\Delta T)=0$ in a time interval $\Delta T$. The complex transfer function $I_{21}(j\omega)$ can be generated by Fourier transforming the signals $s_1(\Delta T)$, $s_2(\Delta T)$ and a division:

$$I_{21}(j\omega) = \frac{F(s_1(\Delta T))}{F(s_2(\Delta T))} = H_{21}(j\omega). \quad (2)$$

Next, a differential filtering of the signals is performed:

$$s_{out} = s_1 - F^{-1}(I_{21}(j\omega))^* s_2 \quad (3)$$

By the definition of $I_{21}$, this differential filtering will give a value of $s_{out}=0$ over the time interval $\Delta T$. This method may be called zero-forcing. Outside the time interval $\Delta T$, the differential filtering gives $$\begin{aligned} s_{out} &= s_1 - I_{21} s_2 \\ &= s_T + H_{21} s_{PN} - I_{21}(s_{PN} + H_{12} s_T) \\ &= s_T(1 - H_{21} H_{12}). \end{aligned} \quad (3)$$

In one embodiment of the invention, an assumption is made that $H_{21}=H_{12}$. With this assumption, the telemetry signal may be recovered as $$s_T = \frac{1}{(1-H_{21}^2)} s_{out}. \quad (4)$$

The term $$\frac{1}{(1-H_{21}^2)}$$

may be referred to as a model-based equalizer for the telemetry signal.

In another embodiment of the invention, instead of using zero-forcing, the filter is directly calculated by minimizing the error function $$\epsilon^2 = (s_1 - I_{21}^{LMS} * s_2)^2 \quad (5),$$

where the filter $I_{21}^{LMS}$ is obtained using the minimization procedure such as that described, for example, in "Adaptive Filter by G. Moschytz and M. Hofbauer, Springer Verlag, Berlin, October 2000". Using this filter, the differential filtered signal is:

$$s_{out} = s_1 - I_{21}^{LMS} * s_2 \quad (6).$$

In another embodiment of the invention, no assumption is made about the relation between $H_{21}$ and $H_{12}$. Instead, a known reference signal is sent through the communication channel and the filter is calculated from the received signal. This results in equalization that includes the effect of the pulser, the mud channel, etc.

Figure 4:
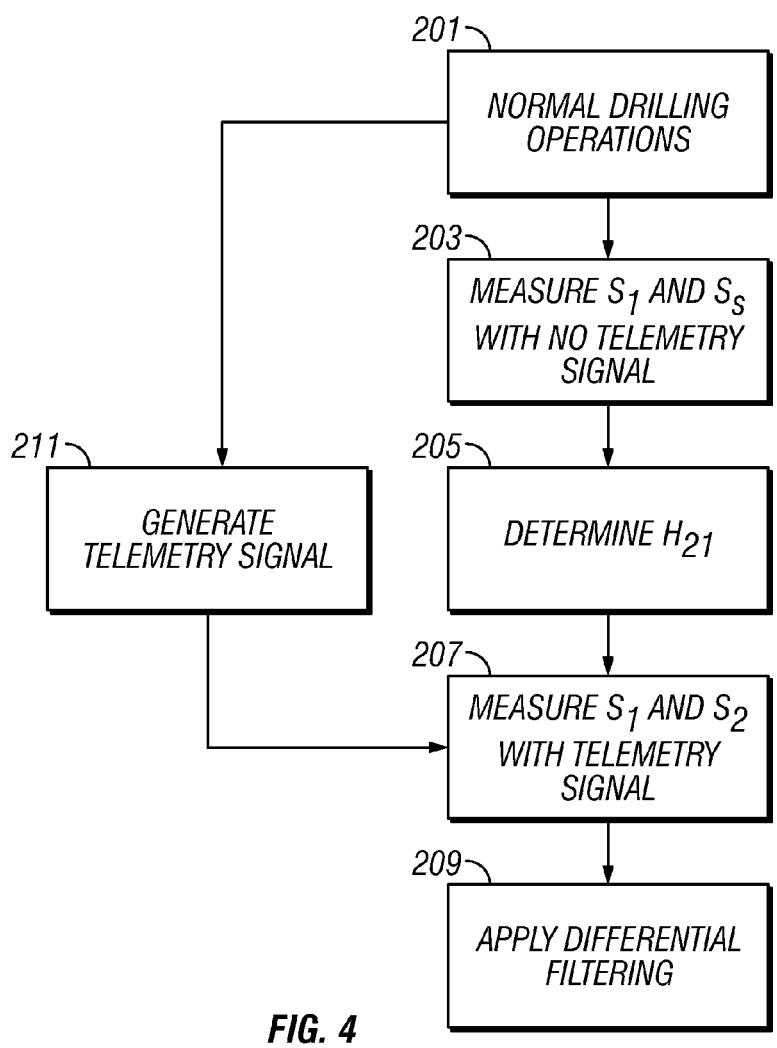
FIG. 4 is a flow chart of one embodiment of the method of the present invention.

A flow chart illustrating the method discussed above is given in FIG. 4. During normal drilling operations 201 the signals $s_1$ and $s_2$ are measured with no telemetry signal 203. The transfer function $H_{21}$ is determined 205 using eqn. (2). Measurements of $s_1$ and $s_2$ are then made with the telemetry signal 211 present 207. By applying the differential filtering 209 given by eqn. (3), eqn. the telemetry signal is recovered.

Figure 5:
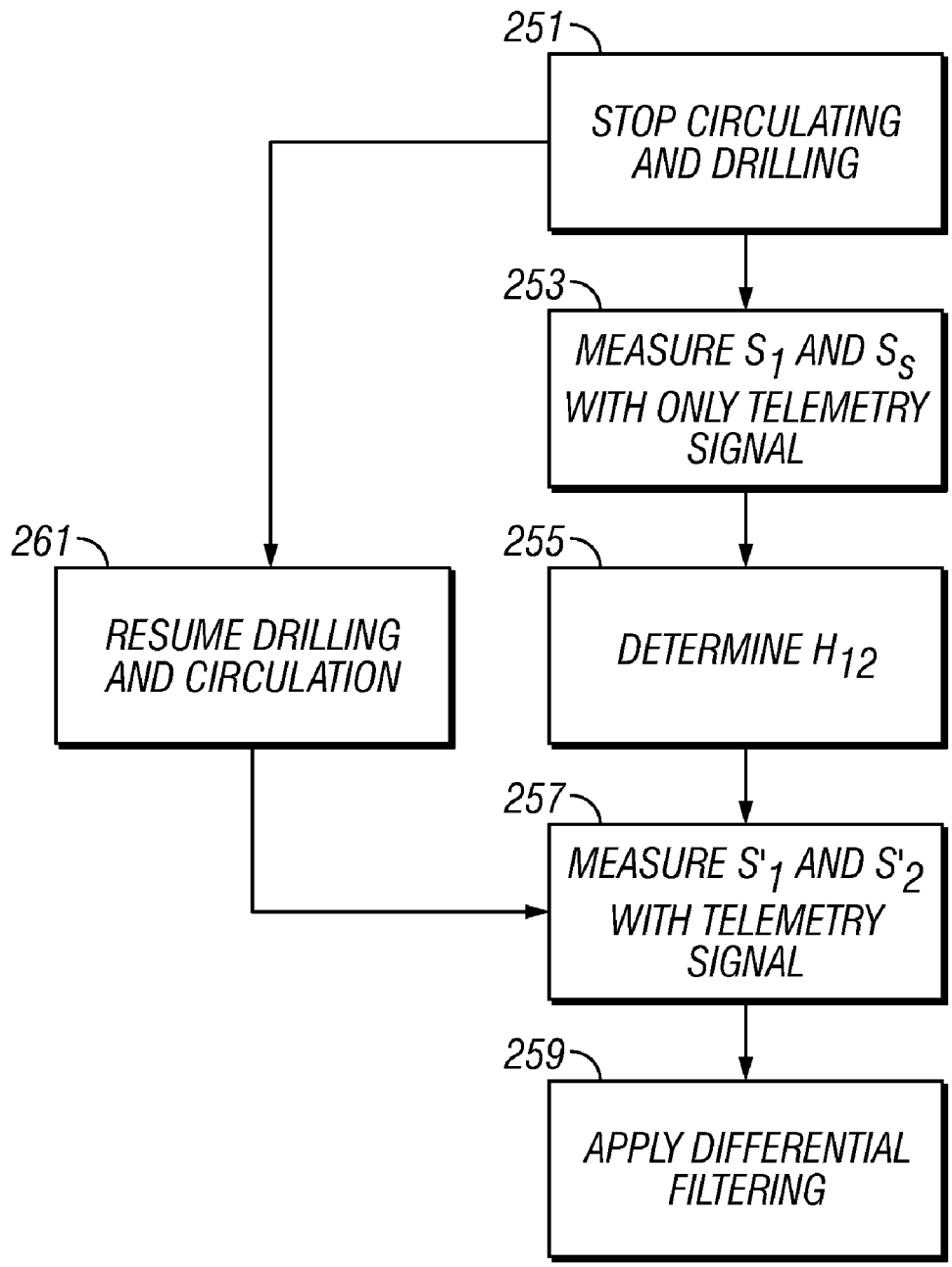
FIG. 5 is a flow chart of another embodiment of the method of the present invention.

In another embodiment of the invention, the assumption that $H_{21}=H_{12}$ is not made. Instead the transfer function between these two sensors is evaluated in the absence of any pump noise $s_{PN}(\Delta T)=0$ in a time interval $\Delta T$. The complex transfer function $I_{12}(j\omega)$) can be generated by Fourier transforming the signals $s'_1(\Delta T)$, $s'_2(\Delta T)$ and a division:

$$I_{12}(j\omega) = \frac{F(s'_1(\Delta T))}{F(s'_2(\Delta T))} = H_{12}(j\omega), \quad (7)$$

which gives a direct measurement of $H_{12}$. This is illustrated in the flow chart of FIG. 5. Circulation and drilling is stopped 251 and the signals $s'_1(\Delta T)$ are $s'_2(\Delta T)$ measured in the presence of only a telemetry signal 253. The transfer function $H_{12}$ is determined 255. Measurements of $s'_1$ and $s'_2$ are then made with the drilling and circulation resumed 261 and the telemetry signal present 257. By applying the differential filtering 259, the telemetry signal is recovered. An auxiliary power source such as a battery may be necessary to operate the downhole mud pulser when there is no mud circulating. As an alternative to the zero-forcing of eqn. (5), a least means square approach may also be used.

Figure 6A:
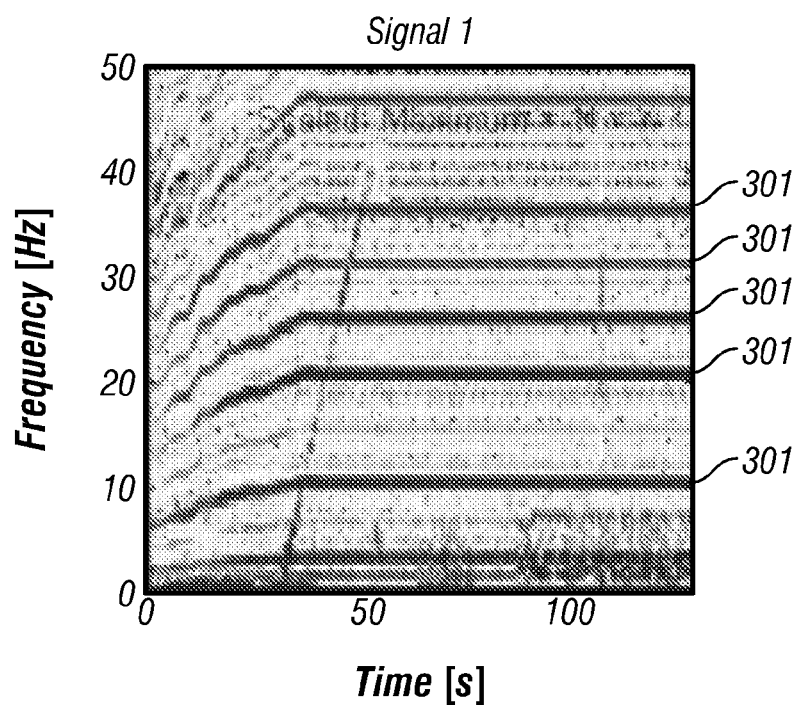
FIGS. 6a and 6b show exemplary signals measured at two spaced apart locations resulting from simultaneous activation of a message source and a noise source.
Figure 6B:
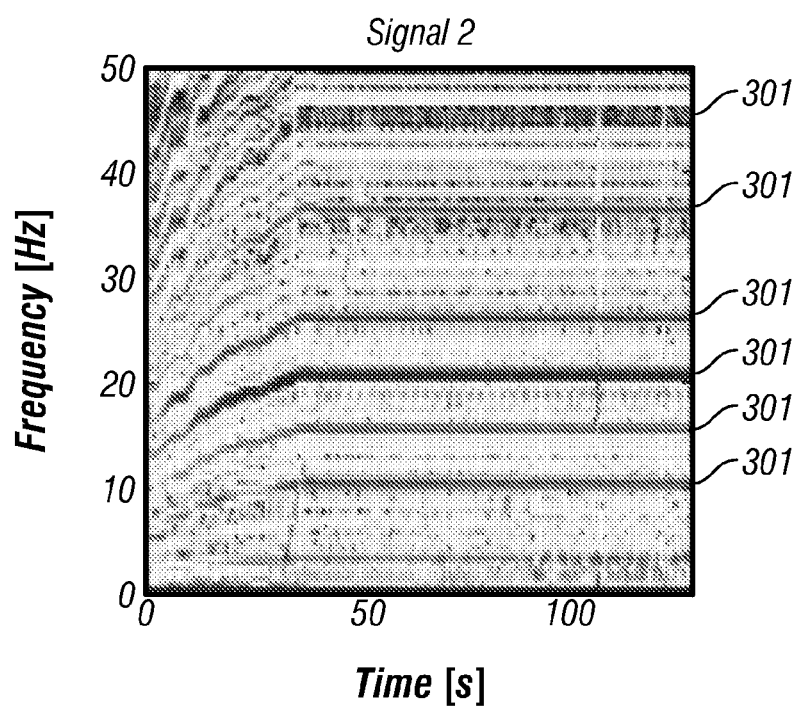
Figure 6C:
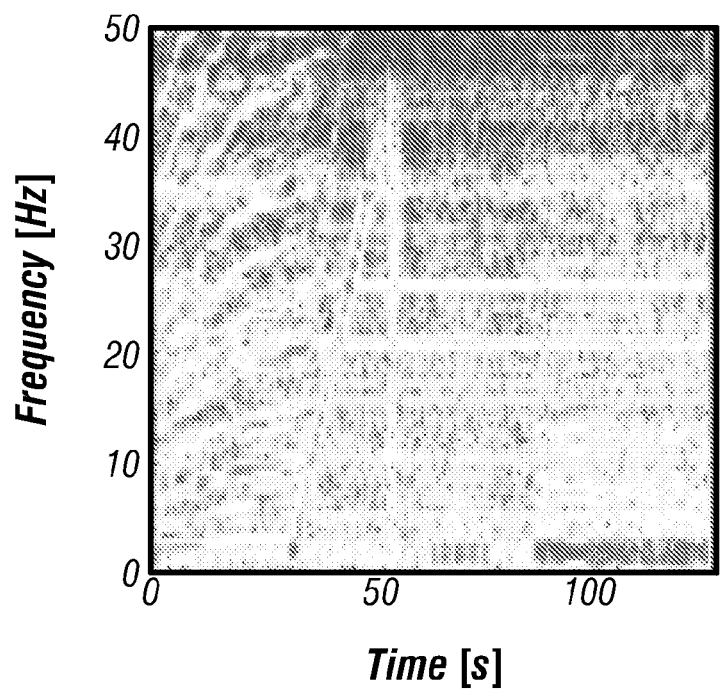
FIG. 6c shows the result of processing the signals of FIGS. 6a and 6b using the method of the present invention.

In yet another embodiment of the invention, the direction of flow may be reversed with only the pumps operating, and another estimate of the transfer function between the two sensors obtained. The pumps are connected to the Kelly hose to flow in the opposite direction FIGS. 6a and 6b show exemplary signals recorded with pump noise 301 present. The abscissa in both figures is time and the ordinate is frequency. A swept frequency telemetry signal was used. FIG. 6c shows the recovered spectrum of the telemetry signal after applying the method discussed above with the assumption that $H_{21}=H_{12}$. The reduction in the pump noise is significant.

In another embodiment of the invention, the channel estimation is performed after any kind of noise cancellation using known reference signals. When a signal s(t) is sent in the telemetry channel, the received signal r(t) consists of the transmitted signal s(t) and its reflections as well as noise n(t).

$$r(t) = s(t) * h(t) + n(t) \quad (6).$$

The noise is of various origins, the main sources are the pumps generating mud flow. To reconstruct the transmitted data we first remove n(t) using different known algorithms for noise suppression. These include pump noise cancellation based on models of the pump noise discussed in the application of Li and Reckman filed concurrently with the present application entitled "System and method for pump noise cancellation in mud pulse telemetry", and dual-sensor methods such as those described in U.S. patent application Ser. No. 11/311,196 of Reckmann et al., and U.S. patent application Ser. No. 11/284,319 of Hentati et al., the contents of which are incorporated herein by reference. The resulting signal r̂(t) consists of the sent signal distorted by the channel and the residuum $R_n(t)$ of the noise.

$$\hat{r}(t) = s(t) * h(t) + R_n(t) \quad (7).$$

The channel h(t) may describe the overall impulse response of the transmission system comprising the mud pulser, much channel with its reflections, sensors, noise cancellation algorithms and other sources of distortions (frequency selectivity/reflections). We assume that remaining noise is very small in comparison to the rest of the signal.

We estimate the channel equalization filter $h^{inv}(t)$ which undoes the effects of h(t), by evaluating the distortions of some transmitted reference signal. The reference signal has to cover the whole frequency range we want to estimate and equalize. The reference signal in one embodiment of the invention is a so called chirp $s_{chirp}(t)$ which is a linearly frequency modulated pulse with a start frequency $f_{start}$ and chirp-rate γ.

$$s_{chirp}(t)=-\cos(\pi\gamma t^2+2\pi f_{start}t), 0\leq t<T_{chirp}$$

$$\hat{r}_{chirp}(t)=s_{chirp}(t)*h(t) \quad (8)$$

Figure 7:
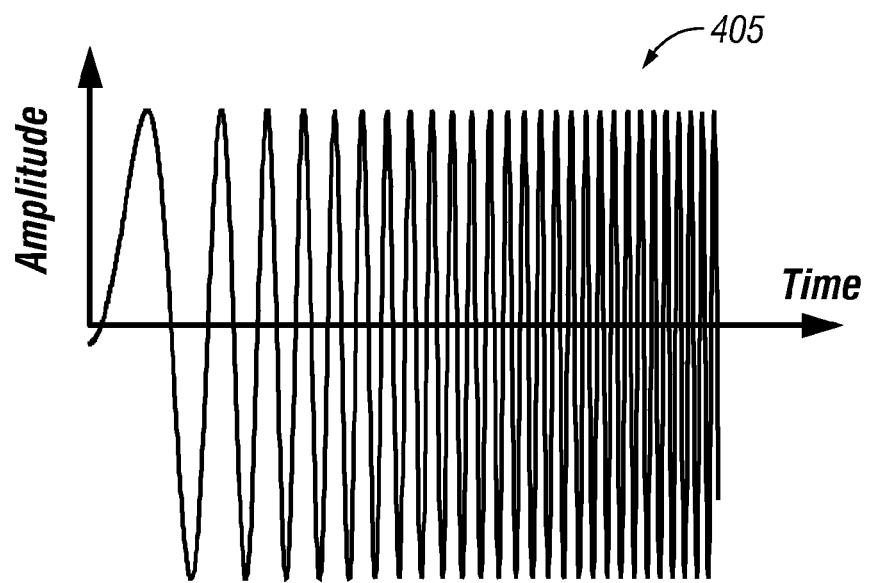
FIG. 7 shows an exemplary chirp signal used in an embodiment of the present invention.

Other reference signals could also be used. An exemplary chirp signal 405 is shown in FIG. 7. In the following we describe the estimation of the equalizer in frequency domain In frequency domain the received signal after noise cancellation can be written as $$\hat{R}(f)=S(f)\cdot H(f) \quad (9).$$

In the following capital letters indicate frequency domain signals. To estimate the channel transfer function H(f), which is the Fourier transform of the channel impulse response h(t), we use the reference chirp.

$$\hat{R}_{chirp}(f)=S_{chirp}(f)\cdot H(f)$$

$$H(f)=\hat{R}_{chirp}(f)/S_{chirp}(f) \quad (10).$$

To equalize the signal $\hat{R}(f)$ we just divide it by H(f) which directly gives the Fourier transform of the send signal.

$$S(f)=\hat{R}(f)/H(f)=\hat{R}(f)\cdot H^{inv}(f) \quad (11).$$

The corresponding time domain equation is $$s(t)=\hat{r}(t)*h^{inv}(t). \quad (12).$$

$h^{inv}(t)$ is the estimated equalization filter.

One embodiment of the present invention provides groups of two adjacent chirps instead of single chirps as reference signals.

$$s_{ref}(t) = \sum_{i=1}^{n} s_{chirp}(t - T_{chirp,1}) \quad (13a)$$

$$\hat{r}_{ref}(t) = s_{ref}(t) * h(t). \quad (13b)$$

It should be noted that the use of two chirps is not a limitation of the invention and the method is independent of the number of repetitions of the reference signal. We evaluate two chirps at a time instead of a single chirp only. It should be noted that synchronization on the received reference signal has to be accurate for the present invention.

In another embodiment of the invention the equalizer is directly estimated by minimizing the error function $$\epsilon^2=(s_{ref}-\hat{r}_{ref}*h^{inv})^2$$

where the filter $h^{inv}$ is obtained using a minimization procedure such as that described, for example, in "adaptive Filter by G. Moschytz and M. Hofbauer, Springer Verlag, Berlin, October 2000". The equalization filter $h^{inv}$ can be implemented as a finite impulse response (FIR) filter or as an infinite impulse response (IIR) filter. The implementation may be done in a direct form, cascaded form, parallel form, lattice form, etc.

Those versed in the art would recognize that applying the DFT on a set of received samples implicitly makes the set periodic with the length of the DFT and therefore the length of the set. If we want to convolve a non cyclic signal $x_M(t)$ of length M with a signal $x_N(t)$ we get a resulting signal $x_{M+N-1}(t)$ of length M+N−1. To get the same result for this acyclic convolution by a cyclic convolution the minimum cycle length needs to be M+N−1. Accordingly, in one embodiment of the present invention, the signals $x_M(t)$ and $x_N(t)$ are extended to this length by appending the appropriate number of zeros. This is called zero-padding. For frequency domain analysis M+N−1 is the new DFT length. In the following we extend zero-padding by 1 and get a new length of M+N to be able to get a DFT length of a power of two. Doing so we can apply the computationally highly efficient fast Fourier transform (FFT) for DFT. Zero-padding of a signal in time domain is equivalent to interpolation in frequency domain.

If we take a set of M samples from the received signal and apply zero padding before the DFT this is the same as a multiplication of the received signal with a rectangular window of length M. Multiplication in time domain corresponds with cyclic convolution in frequency domain. The frequency transform of a rectangle is the sinc function. Applying the DFT on the zero-padded signal thus does not give us the frequency transform of our original signal, which would be the convolution with a Dirac impulse, but the frequency domain convolution with a sinc function. The high amplitudes of the side lobes of the sinc function result in the well known Gibbs phenomenon. To get a spectrum similar to our original spectrum we have to choose a window of length M whose frequency transform has low amplitude side lobes and is as narrow as possible. In digital signal processing many different windows are known. In one embodiment of the invention, the Hanning window $$w(n) = \begin{cases} 0.5 - 0.5\cos(2\pi n/M) & 0 \leq n \leq M \\ 0 & \text{otherwise} \end{cases} \quad (15)$$

is used, though other windows like the Hamming window, triangular window or the Kaiser window may be used. The quality of the channel estimation and with it the quality of the equalizer directly depends on the amount of noise on the evaluated chirp signal. To increase the robustness against noise we use a moving average of the estimated channel transfer function H(f).

Figure 8:
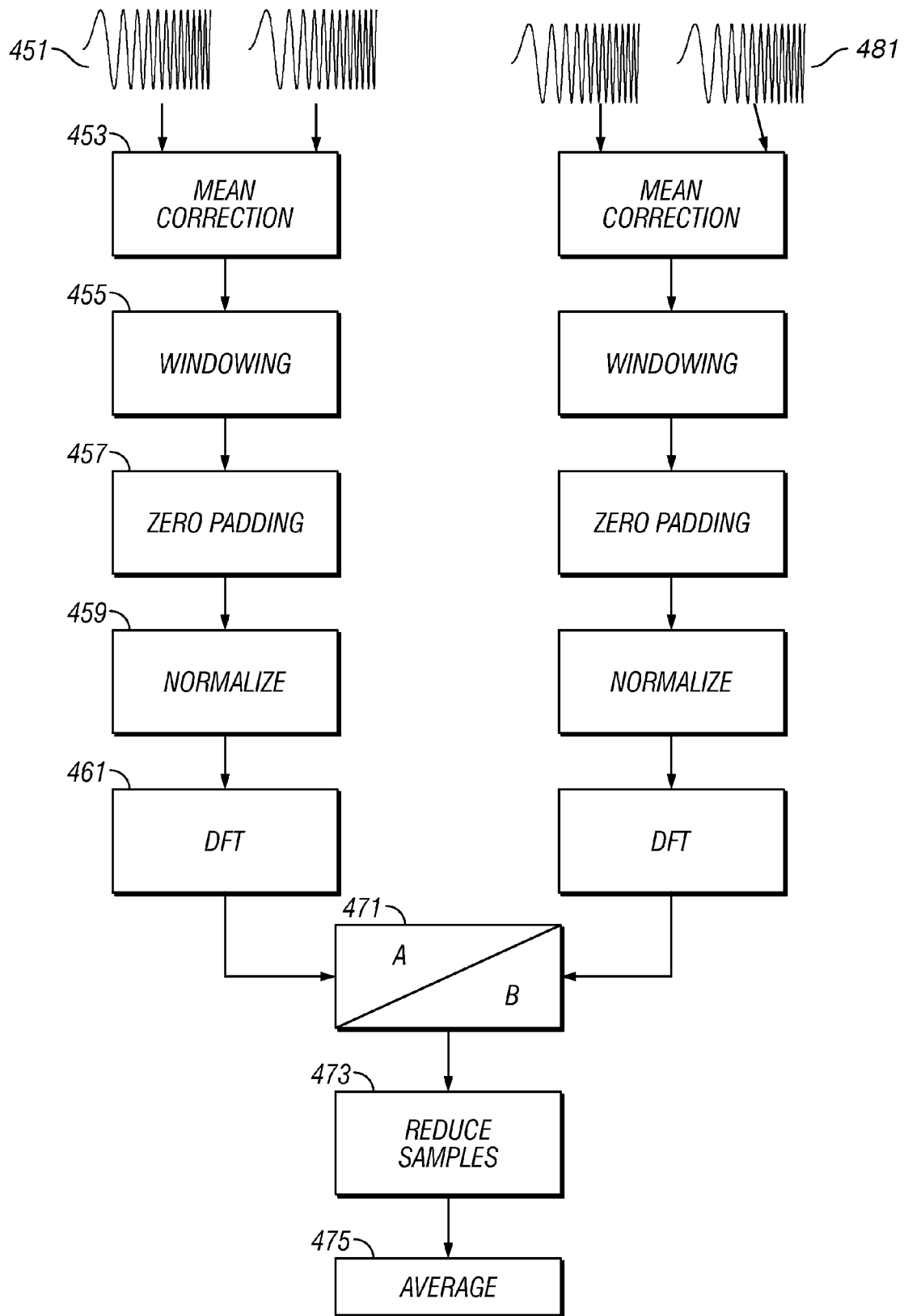
FIG. 8 is a flow chart of a channel estimation method using a reference signal.

The method of estimating the channel transfer function is illustrated in FIG. 8. To estimate the channel transfer function, we take the transmitted signal $s_{ref}(n)$ consisting of two reference chirps 451 (together they may have a length M), multiply them with a suitable windowing function 453 w(n) and subtract the signal average. Afterwards we apply zero padding 455 of the same length which gives a DFT length of 2M. This implies a length of M/2 for h(t) and $h^{inv}(t)$ each, since $\hat{r}(t)=s(t)*h(t)$ is of length M+M/2 and $s(t)=s(t)*h(t)*h^{inv}(t)$ of length 2M. This is normalized 459. Applying the 2M point DFT 461 gives $S_{ref}(f)$. We proceed the same way with the two received chirps 481 after noise cancellation $\hat{r}_{ref}(n)$ and get $\hat{R}_{ref}(f)$. The estimated channel transfer function is given by the ratio 471

$$H(f)=\hat{R}_{ref}(f)/S_{ref}(f). \quad (16).$$

For the corresponding channel impulse response h(t) we had to assume a maximum length of M/2. This implies that h(t) has to be zero padded by 3 times its own length to correspond with the estimated H(f). Since zero-padding in time domain is the same as interpolation in frequency domain, resampling in the frequency domain is its inverse. We keep every fourth sample 473 of the channel transfer function H(f) and get the DFT of h(t) without zero-padding. The robustness against noise is increased by averaging 475 over the last couple of received chirp pairs.

Figure 9:
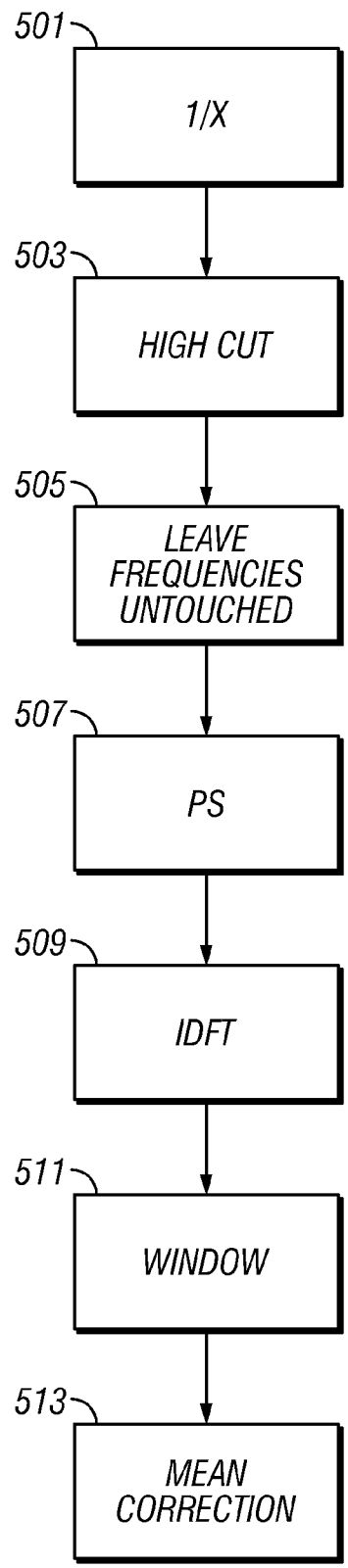
FIG. 9 is a flow chart of a channel equalization method that may be used in combination with the method of FIG. 9.

The equalizer estimation on the channel transfer function is depicted in FIG. 9. As discussed above the equalizer is the inverse 501 of the estimated channel transfer function.

$$H^{inv}(f)=1/H(f).$$

At this state of the equalizer estimation $H^{inv}$ (f) still tries to equalize the whole frequency band up to half the sampling rate. Since we perform some lowpass filtering with cut off frequency $f_{cutoff}$ for high frequency noise suppression prior to the equalizer estimation, the estimation above $f_{cutoff}$ is just based on remaining noise and therefore has to be discarded. For simplicity we apply an ideal lowpass here 503. The same applies for the estimation of frequencies above the highest chirp frequency $\gamma T_{chirp}$. Since the bandwidth of the data signal might cover the band between $\gamma_{chirp}$ and $f_{cutoff}$ we set $H^{inv}$(f) to 1 at this band which means we leave the signal to be equalized untouched in this frequency range. Additionally we have to perform some pole suppression 507. Frequencies with amplitude above a certain threshold are reset to 0. To finally get $h^{inv}$(t) we apply the inverse M/2 point DFT 509 on $H^{inv}$(f). $h^{inv}$(t) is periodic with M/2. To get the equalization filter coefficients we have to cut out an appropriate portion of $h^{inv}$(t). Therefore we use a M/2 Hanning window 511 centered above the highest amplitude of $h^{inv}$(t). In one embodiment of the invention, the equalizer is re-estimated for every new chirp pair. Hence we reduce the filter by its mean and scale its energy to 1 513. Otherwise we would get steps in the equalized signal at each filter update.

Figure 10:
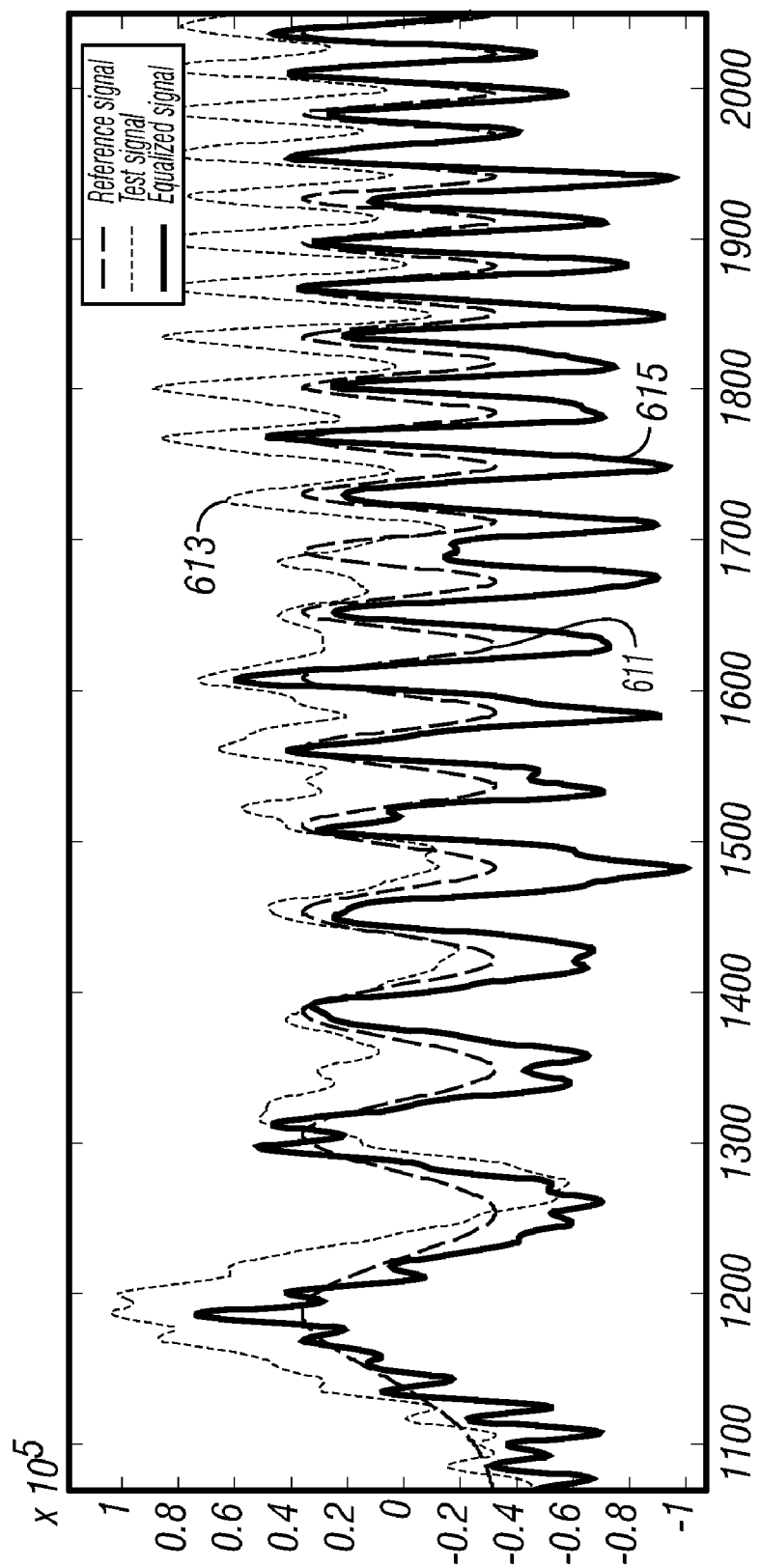
FIG. 10 shows results of using the method of FIGS. 8 and 9.

In FIG. 10, we depict the effects of equalization on a signal. 613 is a received chirp and 611 is the reference signal. The equalized chirp is depicted by 615. The amplitude of the received chirp changes over frequency and the phase differs from the sent signal for low to medium frequencies. Phase shifts can be identified by the peaks and troughs of 611 and 613 being displaced. After equalization, the amplitude of the chirp is closer to that of the reference chirp and there is also better agreement of the phase.

Another embodiment of the invention uses an extended reference signal which results in changed DFT length and a changed pass band filter. If the modulated data occupies frequencies above the maximum frequency $\gamma$ of the chirp we do not set $H^{inv}$(f) to one for $f>\gamma$ but just for $f>f_{max}$ where $f_{max}$ is the maximum frequency of the telemetry signal. Compare with the discussion above with respect to 503. We implement the DFT as FFT (fast fourier transform) due to its computational efficiency. The length of the FFT has to be a power of 2. As above, we assume length M for a chirp pair and M/2 for h(t) and $h^{inv}$(t). Additionally our preamble signal has a length of P samples. In case of equalizer estimation without utilizing the preamble a FFT-length of $L_{min}=2M$ is sufficient. In case that the preamble is utilized as well the minimum FFT-length is $L_{min}=2M+P$. The FFT length is $2^{round(log\ 2(L_{min}))}$.

The present invention also recognizes the fact that the mud channel may be time-varying, i.e., the transfer function may change as a function of time. One embodiment of the invention accounts for the time-varying nature of the channel by using an adaptive equalizer: the filter evaluation is done at different times during the course of drilling.

The message signal may represent the output of a downhole formation evaluation sensor. Typically, the reconstructed signal at a surface location is decoded to provide an estimate of the measurement made by the formation evaluation sensor. The decoded signal may then be stored on the tangible medium for further processing or display. The message signal may also represent the output of a downhole sensor providing measurements related to drilling conditions, such as rotational speed, weight on bit, pressure, temperature, torque, and may also include survey information about the position and orientation of the borehole.

The operation of the transmitter and receivers may be controlled by the downhole processor and/or the surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks.

The foregoing description is directed to particular embodiments of the present invention for the purpose of illustration and explanation. It will be apparent, however, to one skilled in the art that many modifications and changes to the embodiment set forth above are possible without departing from the scope of the invention.

What is claimed is:

1. A method of communicating a signal through a fluid in a borehole between a downhole source location and a surface location, the method comprising:
    generating a message signal at the source location and receiving a first signal at the surface location responsive to the message signal; and
    estimating the message signal by applying a channel equalization filter to the first signal;
    wherein the channel equalization filter is derived at least in part from a measured signal at the surface location responsive to a reference signal at the downhole location and minimizing an error function of the form:

$$\epsilon^2=(s_{ref}-\hat{r}_{ref}*h^{inv})^2$$

where $\epsilon^2$ is a function being minimized, $s_{ref}$ is the reference signal, $h^{inv}$ is the equalization filter, and $\hat{r}_{ref}$ is a signal received at the surface location responsive to the reference signal.

2. The method of claim 1 wherein the reference signal comprises a chirp signal.

3. The method of claim 1 further comprising applying a noise cancellation filter to the first signal prior to applying the equalization filter.

4. The method of claim 1 further comprising determining the equalization filter from a ratio of a Fourier transform of the measured signal and a Fourier transform of the reference signal.

5. The method of claim 1 wherein the message signal represents an output of a formation evaluation sensor, the method further comprising storing the estimated message signal on a tangible medium.

6. The method of claim 1 wherein the message signal represents an output of a drilling sensor module, the method further comprising storing the message signal on a tangible medium.

7. The method of claim 3 wherein the noise cancellation filter is at least one of: (i) a pump noise cancellation filter, and (ii) a filter derived from dual sensor measurements.

8. The method of claim 1 further comprising deriving the equalization filter at more than one time.

9. A system for evaluating an earth formation, the system comprising:
    (a) a bottomhole assembly (BHA) configured to be conveyed in a borehole in the earth formation;
    (b) a formation evaluation (FE) sensor on the BHA configured to make a measurement indicative of a property of the earth formation;
    (c) a message source on the BHA configured to generate a message signal indicative of the property of the earth formation, the message signal propagating to a surface location through a fluid in the borehole;

(d) a sensor at a surface location configured to provide a first signal responsive to the message signal (e) a processor configured to:
   (A) estimate the message signal by applying a channel equalization filter to the first signal; and
   (B) derive the channel equalization filter using a measured signal at the surface location responsive to a reference signal generated by the message source;
   wherein the processor is configured to derive the channel equalization by minimizing an error function of the form:

$$\epsilon^2 = (s_{ref} - \hat{r}_{ref} * h^{inv})^2$$

where $\epsilon^2$ is a function being minimized, $s_{ref}$ is the reference signal, $h^{inv}$ is the equalization filter, and $\hat{r}_{ref}$ is a signal produced at the surface location responsive to the reference signal.

10. The system of claim 9 wherein the reference signal comprises a chirp signal.

11. The system of claim 9 wherein the processor is further configured to apply a noise cancellation filter to the first signal prior to applying the equalization filter.

12. The system of claim 9 wherein the processor is further configured to determine the equalization filter from a ratio of a Fourier transform of the measured signal and a Fourier transform of the reference signal.

13. The system of claim 11 wherein the noise cancellation filter is at least one of: (i) a pump noise cancellation filter, and (ii) a filter derived from dual sensor measurements.

14. The system of claim 9 wherein the processor is further configured to derive the equalization filter at more than one time.

15. The system of claim 9 wherein the message source further comprises a pulser including an oscillating shear valve.

16. A computer-readable medium product having stored thereon instructions that when read by a processor cause the processor to execute a method, the method comprising:
   estimating a message signal generated by a message source on a bottomhole assembly conveyed in a borehole in an earth formation, the message signal being indicative of a property of the earth formation, by applying a channel equalization filter to a first signal produced by a sensor at a surface location responsive to the message signal after it has propagated to the surface location through a fluid in the borehole;
   wherein the channel equalization filter is derived using a measured signal at the surface location responsive to a reference signal generated by the message source and minimizing an error function of the form $$\epsilon^2 = (s_{ref} - \hat{r}_{ref} * h^{inv})^2$$

where $\epsilon^2$ is a function being minimized, $s_{ref}$ is the reference signal, $h^{inv}$ is the equalization filter, and $\hat{r}_{ref}$ is a signal produced at the surface location responsive to the reference signal.

17. The medium of claim 13 further comprising at least one of (i) a ROM, (ii) an EPROM, (iii) an EAROM, (iv) a flash memory, and (v) an optical disk.

* * * * *